J. N. SHAW.
COFFEE URN.
APPLICATION FILED NOV. 25, 1912.

1,078,171.

Patented Nov. 11, 1913.

WITNESSES:
F. C. Matheny
E. Peterson

INVENTOR:
John N. Shaw
BY
Pierre Barnes
ATTORNEY

COLUMBIA PLANOGRAPH CO., WASHINGTON, D. C.

UNITED STATES PATENT OFFICE.

JOHN N. SHAW, OF SEATTLE, WASHINGTON.

COFFEE-URN.

1,078,171. Specification of Letters Patent. Patented Nov. 11, 1913.

Application filed November 25, 1912. Serial No. 733,300.

*To all whom it may concern:*

Be it known that I, JOHN N. SHAW, a citizen of the United States, residing at Seattle, in the county of King and State of Washington, have invented certain new and useful Improvements in Coffee-Urns, of which the following is a specification.

The object of the present invention is to simplify the construction and operation of apparatus which is employed in the production of drip coffee of suitable strength and flavor and without unduly soaking the coffee grounds to extract any considerable amount of tannic acid therefrom.

The invention consists in the novel construction and arrangement of its various parts, as will be more fully described in the following specification and particularly pointed out in the claims.

Figure 1:
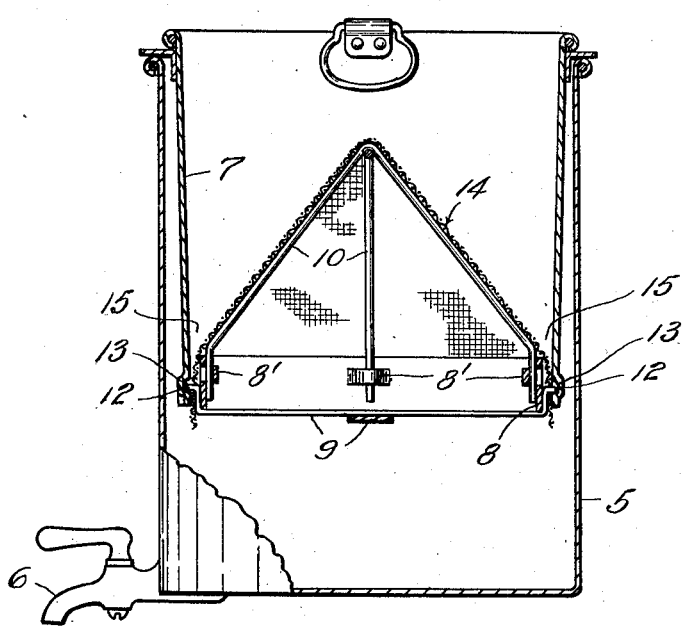
Figure 2:
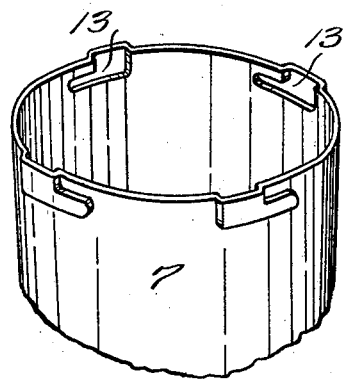
Figure 3:
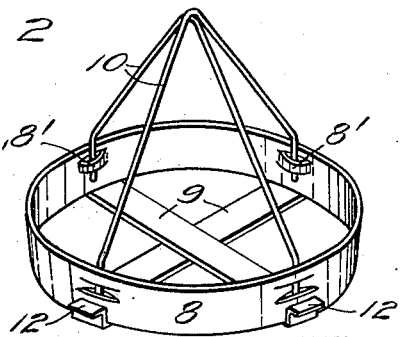

In the accompanying drawings, Figure 1 is a vertical sectional view of an urn embodying my improvements. Fig. 2 is a fragmentary perspective view of the steeping vessel shown inverted. Fig. 3 is a perspective view of the strainer frame shown detached.

The reference numeral 5 designates a cylindrical vessel or beverage-container and, as illustrated, is provided with a tap or faucet 6. Adapted to be inserted within said vessel is a steeping vessel having a circular shell or wall 7 and a removable percolating bottom. Said bottom is formed of a frame comprising a ring 8 which is advantageously held against distortion by cross braces 9 and having connected to the ring a frame comprised of wires 10, or an equivalent, which extend upwardly and inwardly to the axis of the vessel. In practice, said frame-wires are formed, as shown in Fig. 1, of two A-shaped members having their lower extremities engaged in pockets formed by pressing inwardly portions 8¹ of said ring. Extending radially outward from the ring and formed desirably from the extremities of braces 9 are fingers 12 which are adapted to fit into L-shaped recesses 13 (Fig. 2) provided in the shell 7 to serve as a bayonet-joint or connection between said frame and the shell.

14 represents a sheet of foraminous material, such as cotton fabric, which is spread over the frame elements 10 while its edges overhang the ring 8 so that when introduced into the shell 7 the fabric will be engaged between the latter and the ring. By such devices, it is seen that the fabric will be supported by the frame in a substantially conical shape, thus affording a relatively large exposed surface and a substantially V-shaped gutter 15 extending thereabout.

In operation, the ground coffee is placed upon the fabric and boiling hot water is poured thereover causing the grounds to be washed into the gutter 15 and gradually percolating through the cloth, resulting in the production of the so-called drip coffee. When the decoction is withdrawn from the vessel 5, more may be produced by adding more ground coffee upon the cloth and pouring hot water over the same. In such replenishing of the urn, the grounds of each concoction collects in superposed layers within the gutter, and only the upper stratum of which will be materially affected by the water and, in consequence, the beverage produced will be free from any appreciable quantity of tannic acid, will be of good quality and may be made of desired strength by withdrawing the liquor through the tap and pouring it as many times as required upon the screen or cloth, 14. The steeping vessel is withdrawn from the beverage-container 5 for dumping the grounds from the former, and the frame may be separated from the shell 7 when the cloth 14 is to be removed for cleaning or to be replaced when worn.

The invention is of relatively inexpensive construction and has proved to be efficient for the purposes for which intended.

What I claim is—

1. The combination with a beverage receptacle and a shell recessed adjacent its lower end adapted to be inserted therein, of a frame adapted to be supported by said shell, said frame comprising a relatively narrow band having inwardly directed struck-out portions, transversely-arranged A-shaped arms supported at their base in said struck-out portions, means carried by said frame extending into said recesses for supporting the same and a strainer cloth supported by said frame.

2. The combination with a beverage receptacle, of a shell adapted to be inserted within said receptacle, said shell having L-shaped recesses arranged adjacent the lower edge thereof, a frame adapted to be supported by said shell, said frame comprising a relatively narrow band having inwardly directed struck-out portions, transversely-arranged A-shaped arms supported at their base in said struck-out portions, braces arranged across the bottom of said band and extending beyond the edge thereof to provide lugs, said lugs adapted to be received within said L-shaped recesses, and a strainer cover for said frame.

Signed at Seattle, Wash., this 6th day of November, 1912.

JOHN N. SHAW.

Witnesses:
 HORACE BARNES,
 E. PETERSON.